United States Patent
Austin

(10) Patent No.: US 9,399,982 B2
(45) Date of Patent: Jul. 26, 2016

(54) AUTO-GYRO ROTOR FLYING ELECTRIC GENERATOR (FEG) WITH WING LIFT AUGMENTATION

(71) Applicant: SKY WINDPOWER CORPORATION, Oroville, CA (US)

(72) Inventor: Robert Austin, Huntsville, AL (US)

(73) Assignee: SKY WINDPOWER CORPORATION, Oroville, CA (US)

( * ) Notice: Subject to any disclaimer, the term of this patent is extended or adjusted under 35 U.S.C. 154(b) by 413 days.

(21) Appl. No.: 14/097,750

(22) Filed: Dec. 5, 2013

(65) Prior Publication Data

US 2016/0010627 A1    Jan. 14, 2016

Related U.S. Application Data

(60) Provisional application No. 61/734,470, filed on Dec. 7, 2012.

(51) Int. Cl.
| | |
|---|---|
| *F03D 9/00* | (2006.01) |
| *F03D 3/02* | (2006.01) |
| *F03D 1/02* | (2006.01) |
| *F03D 5/00* | (2006.01) |
| *B64C 27/08* | (2006.01) |
| *F03D 11/04* | (2006.01) |

(52) U.S. Cl.
CPC ............... *F03D 9/002* (2013.01); *B64C 27/08* (2013.01); *F03D 1/02* (2013.01); *F03D 3/02* (2013.01); *F03D 5/00* (2013.01); *F03D 11/04* (2013.01); *B64C 2201/12* (2013.01); *F05B 2240/40* (2013.01); *F05B 2240/921* (2013.01); *Y02E 10/70* (2013.01); *Y02E 10/72* (2013.01); *Y02E 10/74* (2013.01)

(58) Field of Classification Search
CPC ............. B64C 27/08; F03D 1/02; F03D 3/02; F03D 5/00; F03D 9/002; F03D 11/04
See application file for complete search history.

(56) References Cited

U.S. PATENT DOCUMENTS

| | | | | |
|---|---|---|---|---|
| 2003/0091437 | A1* | 5/2003 | Roberts | F03D 11/04 416/9 |
| 2005/0017515 | A1* | 1/2005 | Roberts | F03D 11/04 290/55 |
| 2012/0104763 | A1* | 5/2012 | Lind | B64C 31/06 290/55 |

* cited by examiner

*Primary Examiner* — Tien Dinh
*Assistant Examiner* — Aaron Rodziwicz
(74) *Attorney, Agent, or Firm* — Dowell & Dowell, PC

(57) ABSTRACT

A flying electric generator for obtaining power from wind currents which includes a fuselage having fore and aft portions and an intermediate portion, a rotor assembly including at least two forward rotors mounted on a pair of forward extending support arms extending from the fuselage and at least two rear rotors mounted to a pair of rearward extending support arms extending from the fuselage and at least one first forward wing mounted to a forward portion of the fuselage and extending outwardly on opposite sides of the fuselage and at least one second rear wing mounted to a rear portion of the fuselage and extending outwardly on opposite side of the fuselage.

22 Claims, 17 Drawing Sheets

AUTO-GYRO ROTOR FLYING ELECTRIC GENERATOR (FEG) WITH WING LIFT AUGMENTATION

BACKGROUND OF THE INVENTION

1. Field of the Invention

The present invention relates to the field of flying electric generators (FEG) and more particularly to a new configuration of auto-gyro rotor flying electric generators featuring wing lift augmentation.

2. Brief Description of the Related Art

The idea of flying electric generators is not new, and several methods of extracting energy from the high altitude winds have been proposed and are now in development. It is well known that the energy content in wind increases with distance from the ground (altitude). Current wind turbine technologies attempt to take advantage of this fact by reaching ever higher, but their cantilever design limits their maximum height, as large and costly steel and concrete bases are required to react against the bending forces introduced by their necessary structural geometry. Flying electric generators or FEGs in contrast require only a thin, light tether attached to a small ground anchor point to react against the force of the wind, and they can climb high above the ground and into the most concentrated and abundant natural energy source of the high altitude winds.

Currently, auto-gyro rotor based FEGs in development have at least four rotors, each having two or more rotor blades, with two rotors rotating in one direction, and two diagonally spaced rotors rotating in an opposite direction. The most commonly seen configuration is four rotors in a symmetric square pattern, with an X-shaped pattern similar to what is shown in FIG. 14. Alternatively, the rotors may be arranged so that the forward or upwind rotors do not interfere with the air flow to the aft or downwind rotors.

The auto-gyro rotor FEG flies up from the ground and hovers as a multi-rotor helicopter. For takeoff and hovering the FEG consumes electric power which is provided from a power grid or a generator on the ground, not shown, depending on the application. Electric power from the ground is transmitted through conductors in a tether and is used to create torque in drive motors for the rotors. These drive motors and their controllers are designed to convert electric power coming up the tether from the ground into torque to turn the rotors and also to convert excess torque available at the rotors into electrical energy to send down the same conductors in the tether for use on the ground. The rotors generate thrust by moving air downward, through the rotor disk. The amount of thrust is controlled either by rotational speed of the rotors, using a fixed pitch blade, or by varying the pitch of the blades while they are rotating at a constant rotational speed, or by a combination of the two techniques. As the rotors create thrust, they require torque input to rotate. The amount of torque required times the rotational rate of the rotor is the power required to maintain that level of thrust. The torque input to keep the rotor turning and create thrust also results in a reaction torque from the air against the rotor. This torque is proportional to the thrust, and because there are pairs of rotors rotating in opposite directions, this torque is normally balanced if each rotor is producing the same thrust.

It is possible to control an FEG rotation about a vertical axis, or yaw, by reducing the thrust of one pair of rotors rotating in one direction while increasing the thrust of another pair of rotors rotating in the opposite direction. If this is done to maintain the total thrust level constant, the FEG will only rotate in yaw, and maintain orientation about the pitch and roll axes, and its position. For the FEG to change orientation about the roll (longitudinal) axis or pitch (transverse) axis, the thrust is increased on the side of the FEG desired to rise, and decreased on the side desired to lower. Maneuvers can be combined as required, with roll, pitch and yaw rotations done simultaneously.

For an FEG to climb, overall thrust is increased and the FEG accelerates upward, descending is the opposite. For the FEG to move laterally, it is rolled or pitched so that a portion of the overall thrust vector is inclined in the direction desired, this component of thrust will accelerate the FEG in that direction. Once the FEG has accelerated to the desired travel speed in a direction, it is leveled out to maintain that speed. The FEG is stopped by rolling and or pitching in the opposite direction to the velocity until the FEG has decelerated to zero speed.

Once the FEG climbs to the generation altitude, where the wind speed is adequate to allow power generation, it flies downwind to a position where an angle of the tether with the ground is acceptable for the wind conditions and space available. The horizontal component of the tension in the tether now reacts against the force of the wind on the FEG, and this force will cause the FEG to naturally rotate in yaw like a weather vane to face into the wind. This is caused by an unbalance in drag from the unequally spaced rotors on each side of the tether, or a by vertical stabilizer placed aft of the tether attach point, or both. As the vehicle yaws to face the wind, the drag on each side balances and the vehicle will maintain a heading. Next, the FEG is commanded to gradually pitch up to a large angle of attack. The positive pitch angle of attack exposes the underside of the rotors to the wind. The thrust of the rotors now has a down-wind component, plus a vertical component.

The vertical component of thrust, plus the lift from the wings in the present invention, must remain equal to the FEG weight plus the vertical component of tether tension where it attaches to the FEG or the FEG will climb or descend. Because the rotor area now exposed to the wind has increased, the thrust also increases. The larger the pitch angle, the larger the exposed area and the larger the thrust. As the FEG angle of attack is increasing, the blade pitch of the rotors must be decreased to limit thrust increase, so that the vertical component of thrust does not increase. Increase in the vertical component of thrust is reduced by the increasing pitch angle, however, a practical maximum for the previous auto-gyro rotor FEG angle of attack was 45 degrees, the addition of wings to and FEG will allow a higher angle of attack, up to about 70 degrees. The inflow of the wind under the rotors applies a torque to the rotors, which drives them to a faster rotational rate, and this accelerating torque increases with reduced rotor blade pitch. To prevent the rotors from accelerating to a faster rotational rate, the electric motors apply torque in the direction against this acceleration, which creates electric power that is sent down the conductors in the tether for use on the ground. When the pitch maneuver is complete, the FEG is flying like a kite, with a large pitch angle of attack, and the tension on the tether tension and weight of the FEG will balance the force of the wind on the FEG.

SUMMARY OF THE INVENTION

This invention is directed to auto-gyro rotor FEGs that include airfoil wings as well as auto-gyro rotors to provide lift to the vehicles. The addition of wings to the FEGs allows them to reach full generating capacity in lower wind speeds. The addition of the wings also allows the vehicles to operate at higher rotor angles of attack, which exposes more of the rotor blade area to the wind. Power generation increases with greater rotor angle of attack.

The FEGs of the present invention include both forward and rear wings which are preferable pairs of wings that are either fixedly or pivotally mounted on opposite sides of a fuselage. In the preferred embodiments shown herein, the front wings are of a conard type and are smaller than the rear wings. The front wings are mounted along a forward portion of the fuselage and the rear wings are mounted along a rear portion of the fuselage. The rear wings will also be provided with ailerons to facilitate maneuvering of the FEGs about a roll axis about a center axis of the fuselage and the wings may also be swept to a rear of the FEGs.

With the addition of airfoil wings to the FEGs there is an increase in lift to the FEGs, allowing less of the thrust created by the rotors to be used to retain the vehicles aloft. When the rotors are required to create less of a vertical component of thrust, they can have their blade collective pitch reduced, which increases torque available for generating electrical power. Alternatively, reducing the requirement of creating lift to retain the FEGs aloft by the rotors allows an increase in the rotor plane angle of attack, as the thrust vector can be made more horizontal if less of the vertical component of power is required. Increasing the vehicles angle of attack increases thrust and torque available for generating power. Also, a combination of both decreasing blade pitch and increasing rotor plane angle of attack may also be used, both contributing to increasing quantity of power being generated. In these ways, the addition of wings can increase the power generated by the FEGs at given wind speeds.

The addition of airfoil wings to the FEGs can also increase the availability of FEGs. Availability is a measure of the fraction of time wind turbines may produce rated power from the wind. Wind speed is often below the minimum required for the FEGs to achieve maximum power generation. This is because at low wind speeds, a majority of the thrust created by the rotors is used to create sufficient lift to keep the FEGs and their tethers aloft. This leaves little or no excess torque available for generating power. Airfoil wings designed to operate at low wind speeds can provide most of the necessary lift to keep the FEGs aloft, allowing the vertical component of thrust from the rotors to be reduced, which allows the FEGs to generate more power as explained above.

In accordance with the invention, for each FEG, a primary elongated fuselage is provide having forward and aft portions and a intermediate portion to which a rotor assembly is attached so as to positioned at a center of gravity of the vehicle and between the front and rear wings. In a first variation of a preferred embodiment of the invention, the rotor assembly is pivotally attached about a generally horizontal axis which is perpendicular to an elongated axis of the fuselage. In a second variation of the first embodiment, the rotor assembly is fixedly mounted to the intermediate portion of the fuselage. In all embodiments of the invention, the rotor assembly includes a central hub which is mounted to the fuselage. The rotor assembly includes at least one pair of forward rotor support arms or booms having inner ends mounted to the hub and outer ends to which are mounted rotors driven by electric motors also positioned at the outer ends of the forward support arms. The rotor assembly also includes at least one pair of rearward rotor support arms or booms having inner ends mounted to the central hub and outer ends to which are mounted rotors driven by electric motors also positioned at the outer ends of the rearward support arms.

In the first embodiment of the invention the forward and aft rotors are positioned so that the four rotors operate in clean, undisturbed, air during all flight maneuvers. The rotors are placed so that when the FEG is facing the wind, each rotor has a direct path to an undisturbed flow of wind, regardless of pitch angle of the FEG. The pair of forward and aft rotors counter-rotate relative to one another.

In the first embodiment, as each rotor receives undisturbed direct wind energy at all phases of flight, there are no discontinuities in control based on angle of attack and wind speed. This allows for a smooth transition from takeoff and hovering flight to kite-like power generating flight.

In accordance with the invention, the intermediate portion of the elongated fuselage is raised outwardly and above the upper surfaces of the fore and aft portions of the fuselage so that the central hub of the rotor assembly is mounted at a center of gravity of the FEG. In the first variation of the first embodiment, the rotor assembly is pivotally mounted about a pivot axis which is perpendicular with, but coplanar to, a central elongated axis defined by the fore and aft portions of the fuselage. This allows a relative change in pitch between the rotors and the fuselage during flight. The central fuselage houses the avionics and computer systems necessary for FEG control, the electronics necessary to communicate with the ground, motor control electronics, and electrical power conversion electronics.

The four rotor support arms or booms, preferably formed as hollow tubes, are connected to the central hub such that the forward rotors are spaced closely to one another such that tips of the rotor blades pass close to one another as they rotate. The aft rotors are spaced farther apart relative to one another so they are not affected by air passing through the forward rotors such that only clean air or undisturbed wind enters the blades of the aft rotors during flight. In the first embodiment, the forward rotors are preferably spaced apart at an angle of at least approximately 90° relative to one another and the angle may be greater. However, the aft rotors are spaced apart at a greater angle than the forward rotors. Also, in preferred embodiments, the forward arms are shorter than the aft arms such that the forward rotors are more closely spaced relative to one another than the aft rotors.

An electric motor such as a permanent magnet DC servo motor is carried by each support arm and each motor is mechanically connected to a rotor and electrically connected to separate electronic motor controllers mounted within the fuselage. The motor controllers function as switching devices for permitting current flow to the motors from a ground power source connected thereto by electrical conductors which extend through a tether by way of which the FEG is connected to a ground anchor during flight. The current flow to the motors provides power to rotate the rotor blades during ascent and descent, and at some other times, during a flight of the FEG. However, during power generation flight in a kite-like mode of the FEG, voltage is generated by a regenerative braking system of the motor drive shafts due to the power of the wind against the rotor blades. When this occurs, the motor controller switches to allow current to flow from the motors to a ground level power grid, power storage device or some other device to be electrically powered by the FEG.

Also mounted to each rotor mounting assembly is a pitch control servo which controls the pitch angle of the rotor blades. The pitch control servo alters a position of a servo wheel or horn which is mechanically linked to a pitch control ring which is non-rotationally mounted about a vertically adjustable sleeve that is mounted to rotate with a blade support knuckle assembly. A description of one acceptable pitch control assembly is shown and described in United States Published Application 2012/0298793, of Nov. 29, 2012, the contents of which are incorporated in their entirety herein by reference.

The cental hub of the rotor assembly also houses electrical connectors for connecting the electrical conductors in the FEG tether as well as a centrally mounted yoke for securing the tether thereto.

In another embodiment of the invention, the forward and aft rotor support arms are of generally equal length and disposed in a generally symmetric X-shaped orientation with two diagonally positioned rotors rotating in one direction and the other two diagonally oriented rotors rotating in an opposite direction.

BRIEF DESCRIPTION OF THE DRAWINGS

A better understanding of the invention will be had with reference to the attached drawings wherein.

DESCRIPTION OF THE PREFERRED EMBODIMENTS

Figure 13:
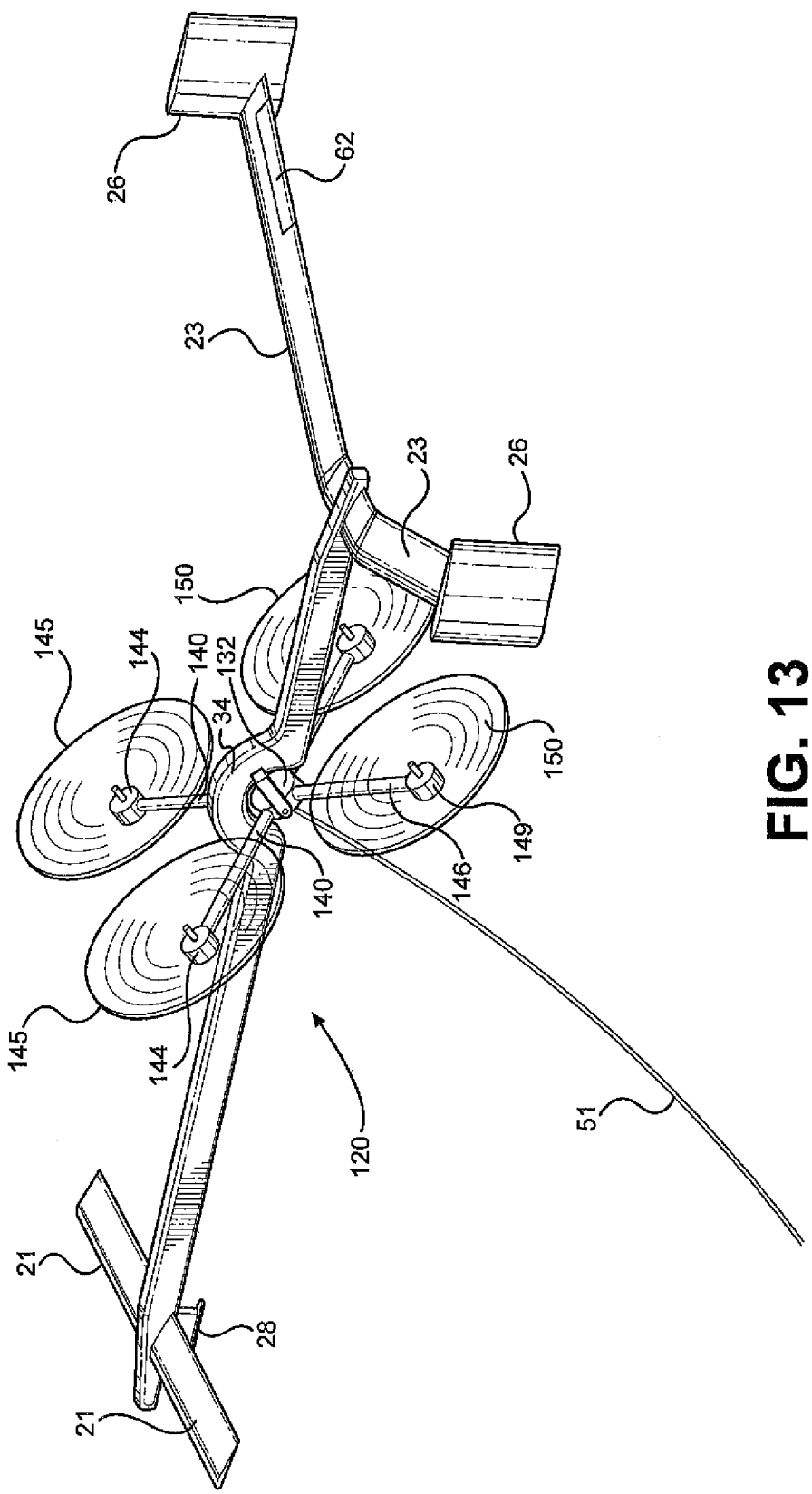
FIG. 13 is a rear top perspective view of an alternate embodiment of FEG having symmetric rotor placement.
Figure 14:
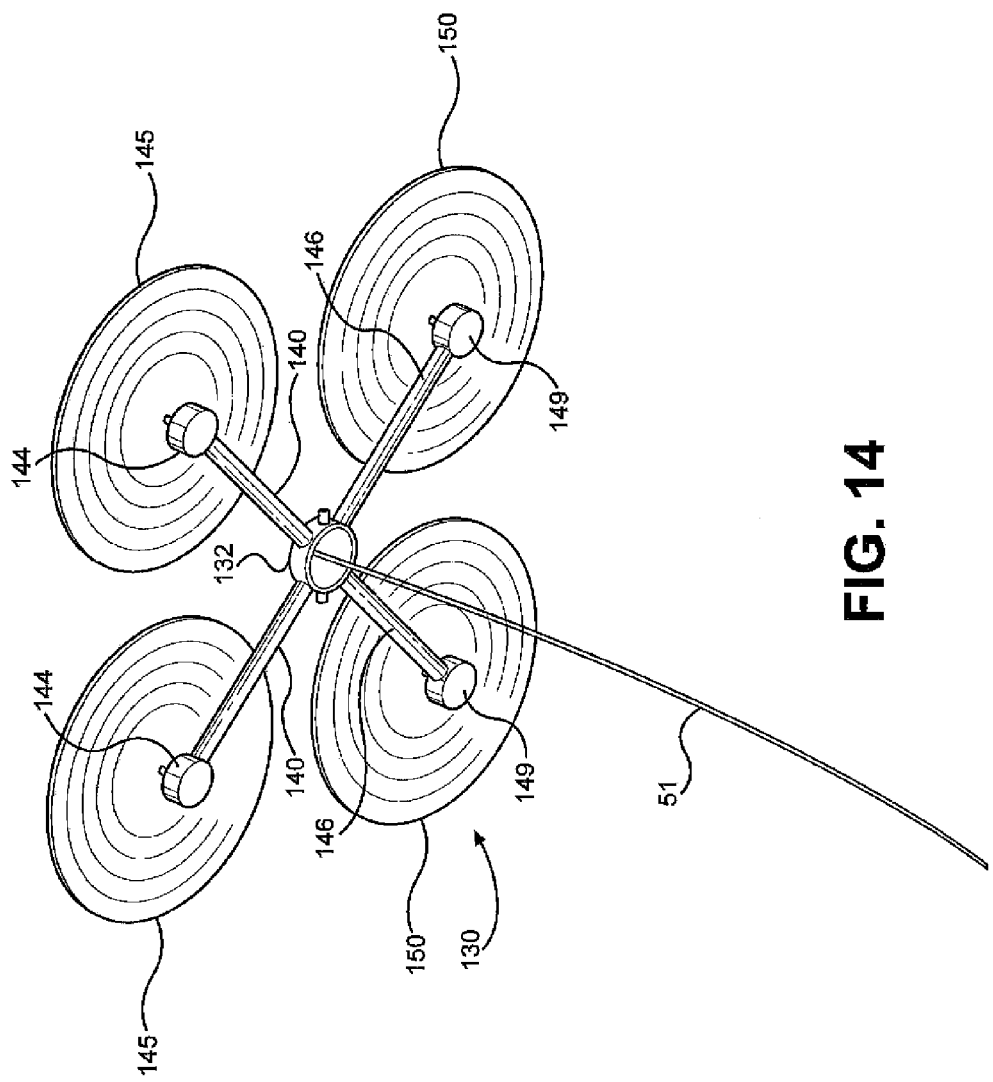
FIG. 14 is a bottom front perspective view of the rotor assembly of FIG. 13.
Figure 15:
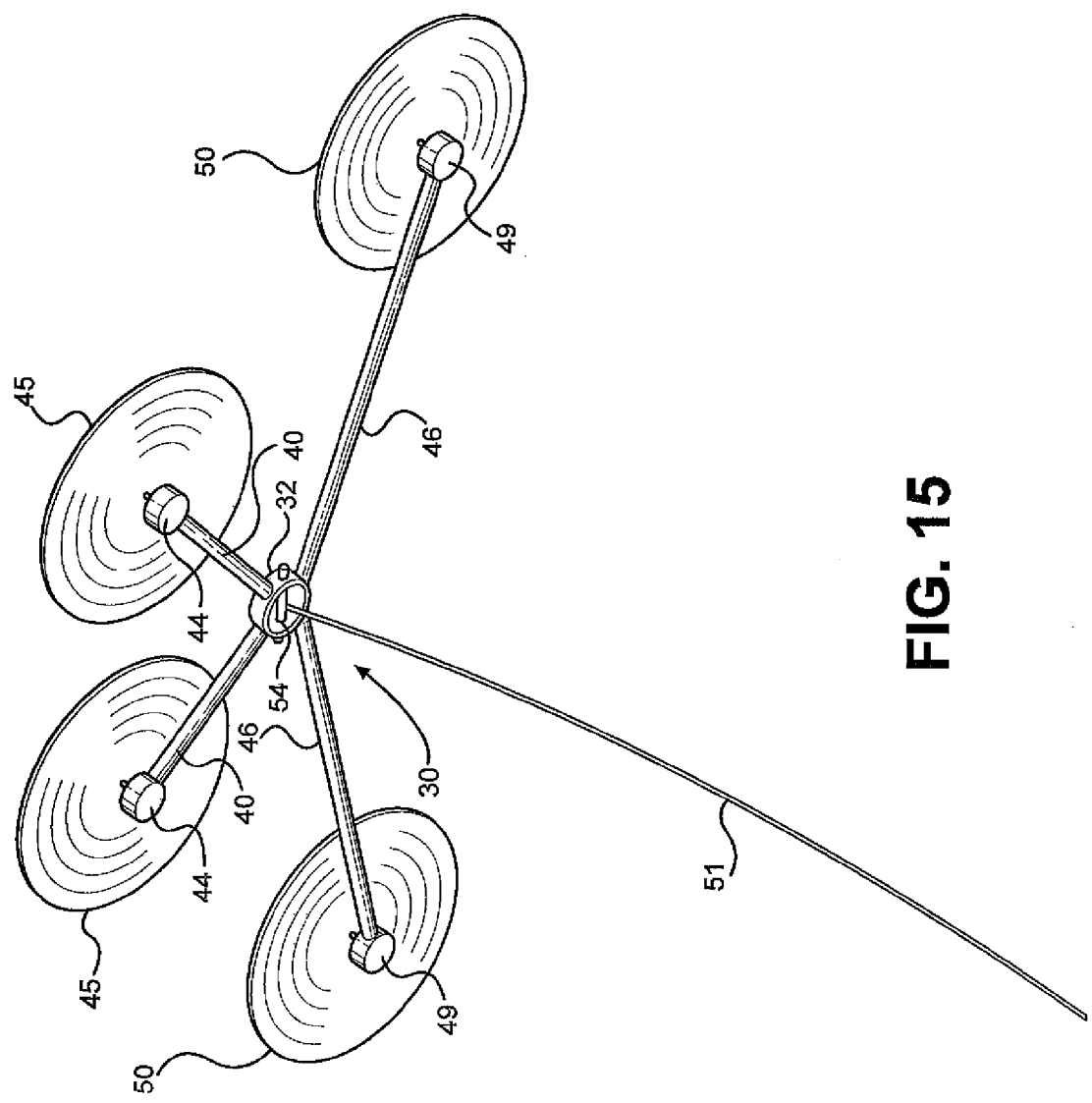
FIG. 15 is a bottom front perspective view of the rotor assembly of FIG. 1 having staggered or offset rotor placement between the front and rear rotors.

The invention combines an auto-gyro rotor FEG 20 with airfoil wings to provide some of the lift necessary to keep the vehicle aloft while generating electrical power. The auto-gyro rotor FEG can have any even number of rotors preferably equal to or greater than four and can have a symmetric rotor layout, as shown in FIGS. 13 and 14, or a staggered rotor configuration, as shown in FIG. 15. The staggered rotor layout, which is a first preferred embodiment of the invention, allows downwind rotors to receive clean air which is air that is not disturbed by upwind rotors during the transition from a zero angle of attack of the rotor plane, which is necessary for vertical takeoff, to a high rotor plane angle of attack used for power generation.

The invention vehicles or FEGs described in detail herein have four auto-gyro rotors, and both types of rotor layouts are described. More rotors can be added by adding pairs of rotors symmetrically to each side of the vehicle. The invention FEGs can have many types of fixed wing configurations, but the preferred and first embodiment of FEG 20 has a configuration as shown in FIGS. 1-5. As shown, the FEG 20 includes canard style wings 21 at a front portion 22 and main wings 23 at the back or aft portion 24 of a long central tubular fuselage 25. The main wings are larger than the canard wings and mounted closer to a center of gravity of the fuselage so that the lift from all wings balances about the center of gravity of the vehicle. Although two canard wings and two main wings are shown in the drawings, the wings may be formed as one continuous canard wing and one continuous main wing.

To stabilize the vehicle in yaw, a vertical stabilizer mounted behind the center of gravity is required. This could be a single vertical stabilizer mounted to an extension of the fuselage (not shown), or a set of vertical stabilizers 26 mounted to the tips of the main wings 23. The main wing can be swept aft to increase the effectiveness of the vertical stabilizers. Adding vertical stabilizers 26 to the tips of the main wing has the added benefit of tip vortex cancellation, increasing efficiency of the wing.

Figure 7:
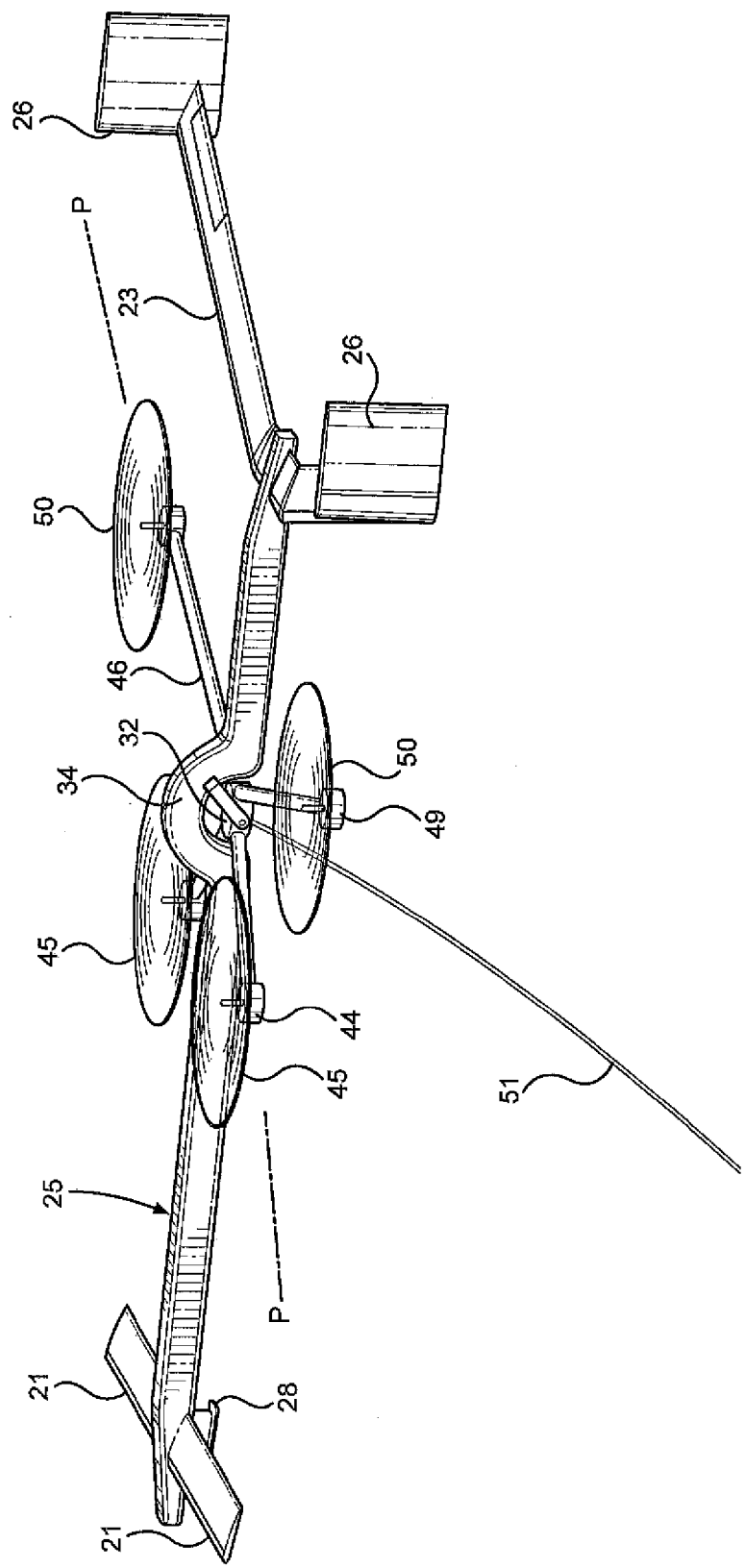
FIG. 7 is a top rear perspective of the FEG shown in FIG. 6.

Lower extensions 27 of the vertical stabilizers may also serve as landing gears for the vehicle, in conjunction with a downward vertical projection 28 which extends from the front portion of the fuselage. As shown, the extensions 27 and 28 extend below the lower surface 29 of the fuselage 25. Such extensions functioning as landing gears will give a wide stable stance from which the vehicle can take off and land. The orientation and configuration of the FEG vehicle at take off and landing is shown in FIG. 7. The vehicle rotor plane "P" is parallel to the fuselage and wing plane for takeoff and landing.

With reference to FIGS. 1-5, the first embodiment of FEG 20 includes a rotor assembly 30 including a central hub 32 which is pivotally mounted at 33 to an intermediate portion 34 of the fuselage 25. The central hub is connected at the center of gravity of CG the FEG and the pivot 33 permits the hub assembly to pivot about a horizontal pivot axis $P_1$ which intersects an elongate central axis A-A of the fuselage, see FIG. 3. Thus the rotor assembly and the fuselage are relative pivotable so that a vertical pitch may be established between the rotor assembly and the fuselage such as shown when viewing the pitch angles in FIGS. 3 and 6. To permit the alignment of axes, the intermediate portion 34 of the fuselage is formed as an inverted "U-shape" structure having an open area 35 in which the central hub 32 of the rotor assembly is mounted.

The rotor assembly 30 includes two forward and outwardly extending rotor support arms or booms 40 having inner ends 41 rigidly connected to the central hub 32 and outer free ends having electric motors 44 mounted thereto. The electric motors are connected to rotors 45 which may have two or more blades. The rotors are exemplified as rotating in the drawings. The rotor assembly also includes two aft or rear and outwardly extending rotor support arms or booms 46 having inner ends 47 rigidly connected to the central hub 32 and outer free ends to which electric motors 49 are mounted. The electric motors drive rear rotors 50.

The motors 44 and 49 associated with the rotors are preferably brushless DC motors having inner permanent magnets which rotate within a series of coils. Power to and from the coils is controlled by motor controllers, not shown. The motor controllers function as switching devices for permitting current flow to the motors from a ground power source connected thereto by electrical conductors which extend through the tether by way of which the FEG is connected to the ground anchor during flight. The current flow to the motors provides power to rotate the rotor blades 45 and 50 during ascent and descent, and at some other times, during a flight of the FEG. However, during power generation flight in a kite-like mode of the FEG, the voltage generated by a regenerative braking of a motor drive shaft due to the power of the wind against the blades of the rotors, the motor controller switches to allow current to flow from the motors 44 and 50 to a ground level power grid, power storage device such as a battery or some other device to be electrically powered by the FEG. By way of example only, supposing power from the ground source has a maximum voltage of 400 volts. As wind places a load against the rotor blades there is a reverse load or torque placed on the motor drive shaft which increases the voltage being produced by a regenerative braking effect on the motor. When the reverse voltage exceeds 400 volts, the voltage controller switches current flow from the FEG to the collector grid or device at the ground or to some device to be powered from the FEG. When the power developed by the wind against the rotors drops to a predetermined level, the controller switches current flow from the ground source back to the motor.

Each arm 40 and 46 is constructed as a hollow tubular boom structure formed of preferably round sectioned thin wall carbon fiber reinforced epoxy construction, though oval or other shape cross sections and other materials such as Kevlar® or fiberglass composites or high strength aluminum alloys such as 6061 may also be used. Streamlined or airfoil cross-sectional tubing or composite structures may be used for the arms, and these may be oriented to give additional lift at certain pitch angles, especially when the FEG vehicle is in kite-like flight.

As shown with respect to the preferred first embodiment of FEG 20, all rotors are able to receive direct, undisturbed wind or air when the FEG is pointed or directed into the wind regardless of pitch angle. In order for the FEG to be controlled by varying rotor thrusts as described herein, the rotors must be installed in sets of counter-rotating pairs, with at least four rotors. The rotors must be placed so that the center of gravity (CG) is at the geometric center of the rotor areas, and so that there is an equal distance from a rotor on the left of the CG to its counter-rotating counterpart on the right of the CG. Also the distance of a rotor behind the CG must be equal to the distance of its counterpart ahead of the CG.

The forward or front (upwind) pair of rotors 45 are set near each other so that only a small distance separates the blade tips as they rotate. The aft rotors 50 are spaced farther apart relative to one another so that they are not effected by air passing through the forward rotors such that only clean air or undisturbed wind enters the blades of the aft rotors during flight. Preferably, the forward rotors are spaced apart at an angle of up to at least approximately 90° relative to one another, and the angle may be greater, however, in the preferred embodiments, the aft rotors will be spaced apart at a greater angle than the forward rotors. Also, the forward arms are shorter than the aft arms such that the forward rotors are more closely spaced relative to one another than the aft rotors.

Figure 11:
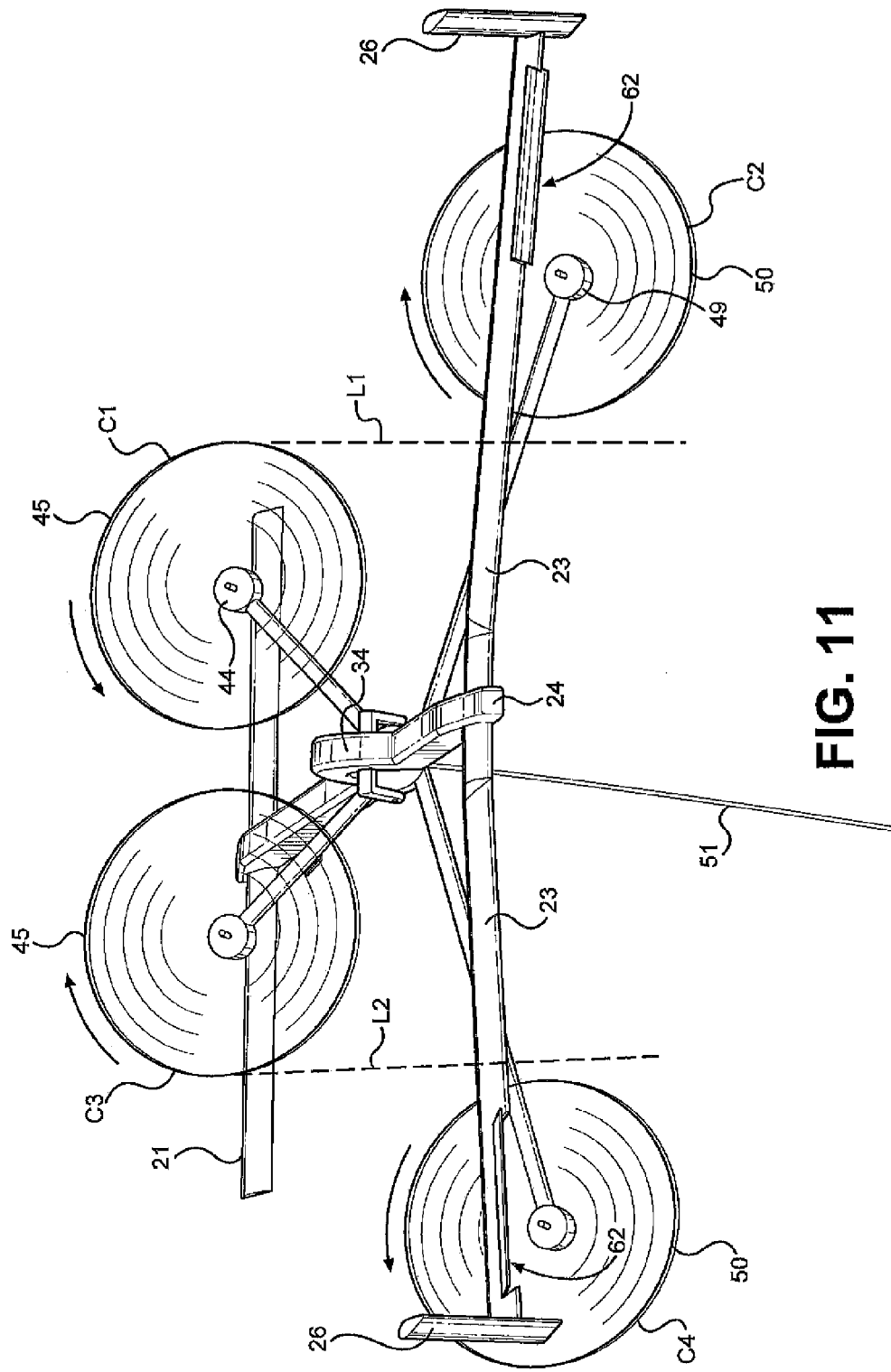
FIG. 11 is a rear top perspective view of the FEG in the roll position of FIG. 10 showing the ailerons pitched in opposite directions on opposite sides of the fuselage.
Figure 12:
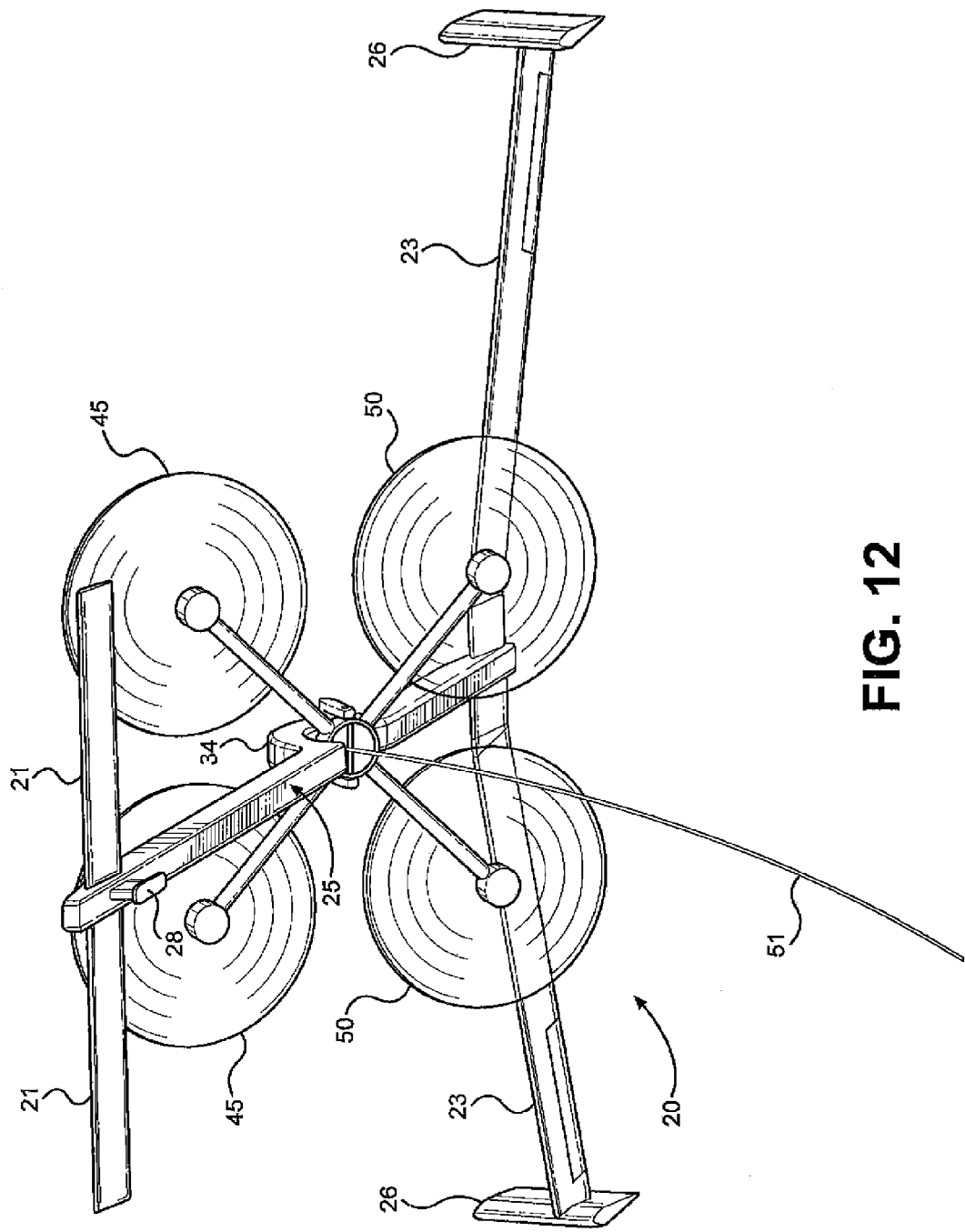
FIG. 12 is a front bottom perspective view of the FEG shown in the roll position of FIG. 11.

The forward and aft rotors must rotate in opposite directions as shown by the arrows in FIG. 11, but the clockwise rotor may be either on the right or left. The aft (downwind) rotors 50 are spaced such that a line L1 extending from the right tangent edge of a circle C1 swept out by the right forward rotor tip 45 does not intersect a circle C2 swept out by the right aft rotor tip 50. In a like manner, the rear left rotor tip must be spaced outwardly relative to a tangent line L2 extending from a left tangent edge of a circle C3 swept by the forward rotor tip 45 so that the line L2 does not intersect a circle C4 swept by the left aft rotor 50. The right and left rotors of the aft pair must also rotate in opposite directions, and each must rotate in the opposite direction from the front rotor nearest to it. This also means that each aft rotor is rotating in the same direction as the forward rotor on the opposite side of the FEG 20.

The motors are initially powered from a ground power source, not shown, through a tether 51 to create lift sufficient to cause the FEG vehicle to rise from the ground and climb to an altitude with sufficient wind to allow the vehicle to generate power. Once at altitude, the vehicle can assume one of two general configurations to begin generating power. Both of these include increasing the angle of attack α of an auto-gyro rotor plane 52 up to about 70° above horizontal, see FIG. 3. The first way the vehicle may increase the auto-gyro rotor plane angle of attack is to employ the pivot joint 33 between the intermediate portion 34 of the fuselage 25 and the rotor assembly 30. An actuator connected between the central hub 32 of the rotor assembly 30 and the fuselage 25, not shown, is used to control the pitch angle between the fuselage and the rotor assembly. The actuator could be of a conventional type such as a linear actuator acting through points on each of the fuselage and the central hub offset from the pivot axis $P_1$, or a gear sector centered about the pivot axis. The wings 21 and 23 in this configuration remain in a plane parallel to the fuselage 25 and they may be rigidly attached to the fuselage.

Figure 8:
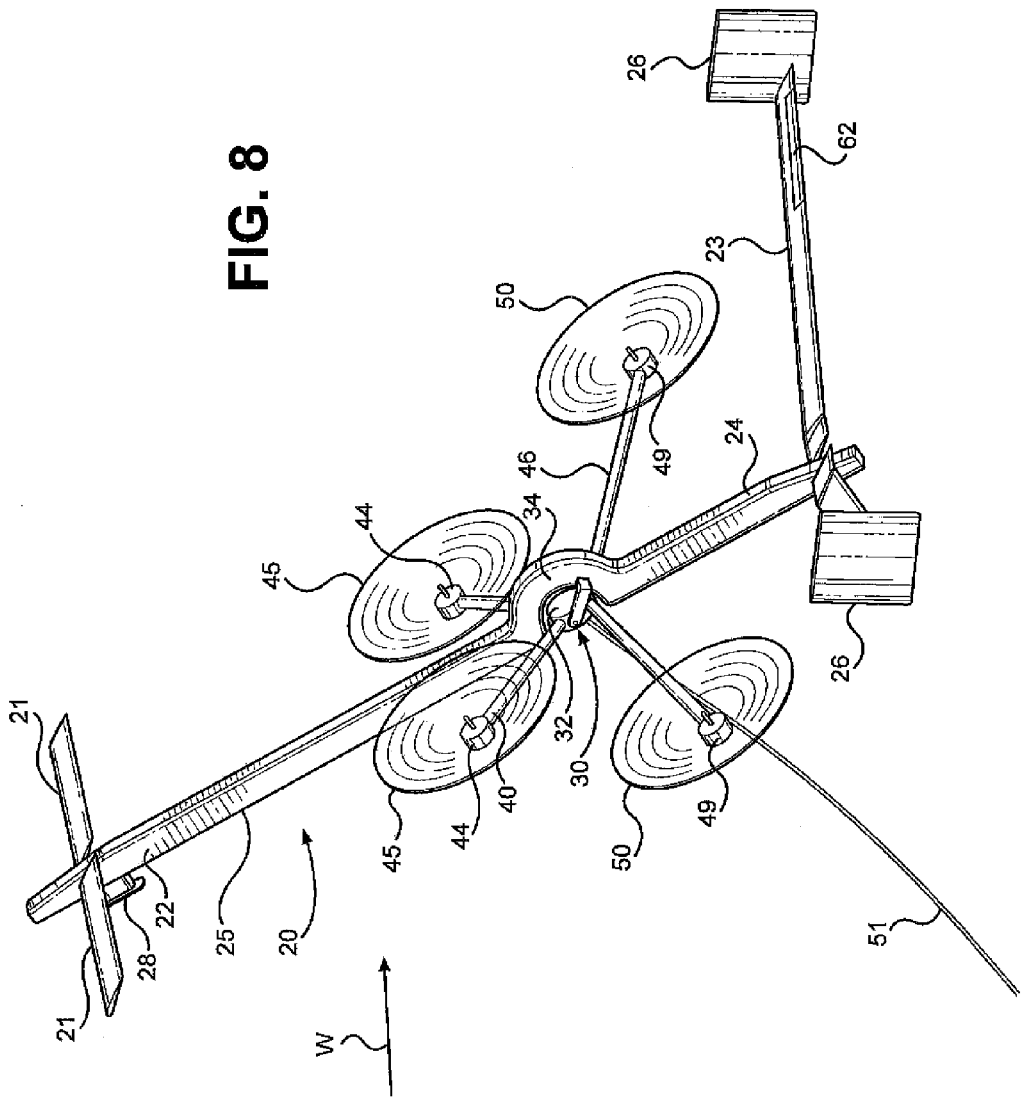
FIG. 8 is a top rear perspective view of the FEG of FIG. 1 in a high pitched power generating configuration.
Figure 9:
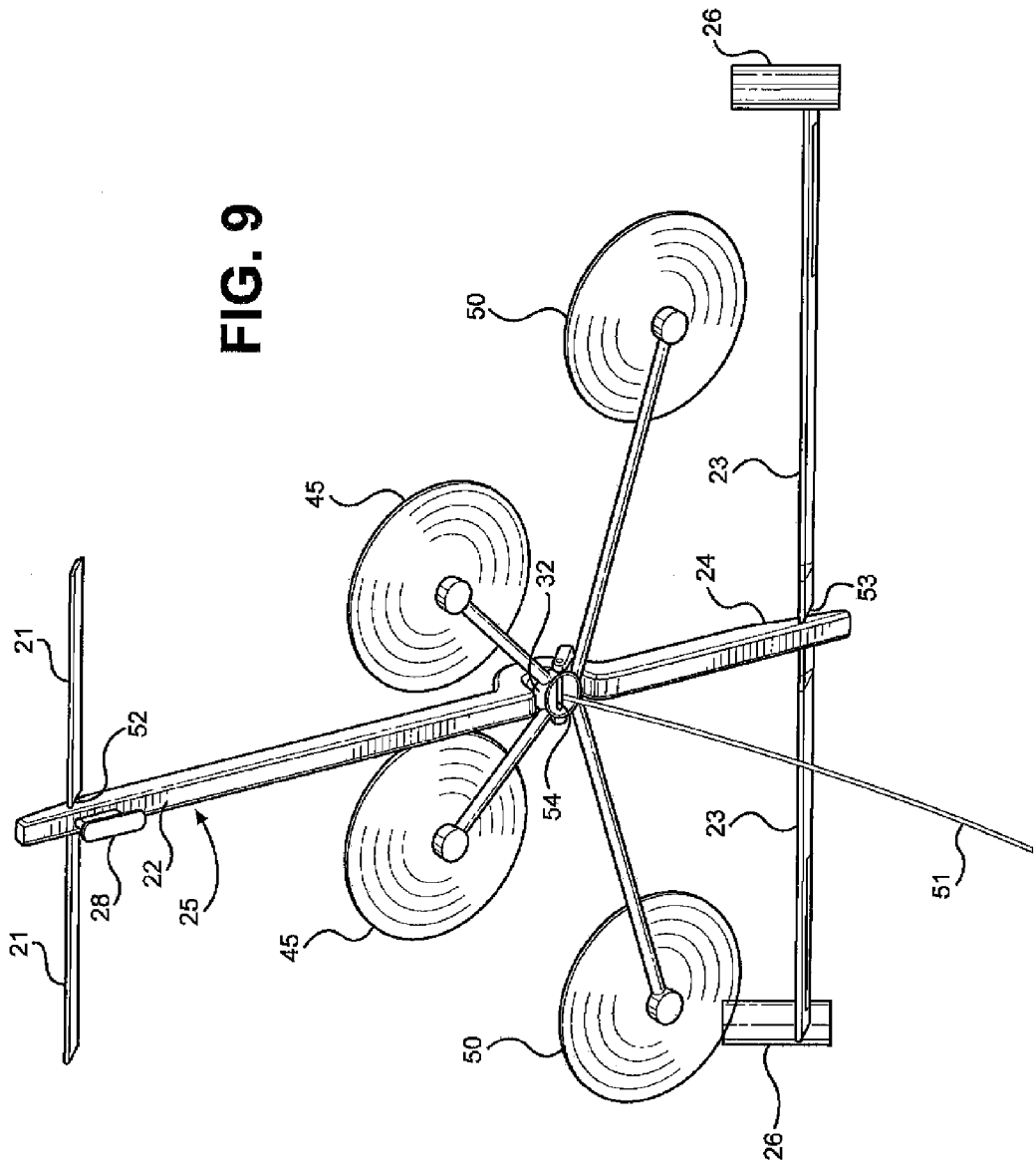
FIG. 9 is a bottom front perspective of the FEG shown in the pitch position of FIG. 8.

A second method of increasing the rotor plane angle of attack α can be seen in FIGS. 8 and 9. In this flight configuration, the rotor assembly 30 and wing support fuselage 25 can be rigidly attached to each other, as the fuselage supporting the wings remains parallel to a plane of the rotors 45 and 50. Both canard wings 21 and main wings 23 must be mounted to the fuselage by a pivot joints at 52 and 53, see FIG. 9, with corresponding actuators so that the wings can be oriented so that their angle of attack remains constant as the rest of the vehicle pitches upward. The angle of attack is shown relative to wind direction arrow "W" in FIG. 8. One disadvantage of this approach is that the distance from the vertical stabilizer aft of the center of gravity decreases with increasing vehicle pitch. Also, fuselage drag would increase as a greater area of the fuselage becomes projected toward the wind as the angle of attack is increased. For these reasons, the first configuration of pivotal rotor assembly is preferred.

The FEG tether 51 reacts against the force of the wind and to bring power both up to the vehicle to allow it to take off and down from the vehicle to the ground when it is generating power. The tether 51 is a single point tether although multiple point tethers may be used. The single point tether must be attached to the FEG at a point 54, see FIG. 9, that is both the FEG center of gravity and the geometric center of the rotor swept areas. As the tension in the tether changes due to varying wind speeds, tether forces will disturb the vehicle stability by generating moments that could induce rotation of the vehicle if the tether is not attached at the vehicle center of gravity. The single point tether is preferred for small FEGs. The main advantage of a single point tether attachment is that the control system need not account for tether tension in dealing with rotational disturbances, as the tether tension does not induce moments on the FEG.

Figure 17:
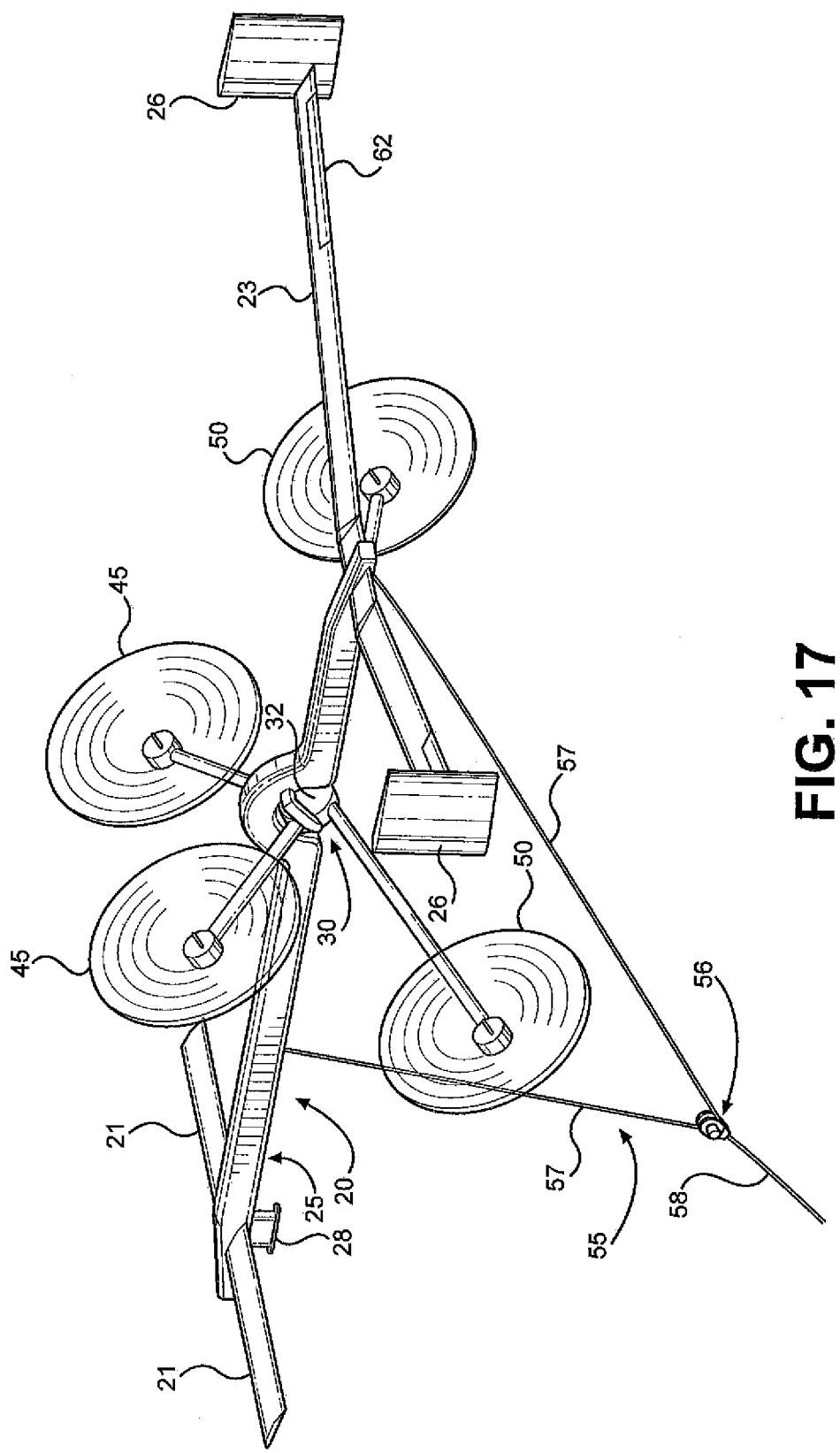
FIG. 17 is a view similar to FIG. 5 showing a two part bridle tether connection.

Larger FEGs, especially those having more than the minimum four rotors may benefit from multiple tether attach points, see FIG. 17. These may be individual tethers each connected to the ground, or may be joined near the FEG with a bridle arrangement 55. The bridle may be a balanced type or an actively controlled system including a mechanism 56 for adjusting the length of bridle elements 57 from the vehicle to the convergence point where the bridle is connected to a single tether 58. Multiple tether attachments can save structural weight, as bending in the fuselage may be reduced. For example, attaching the multiple tethers to the fuselage at or very near each rotor will direct the wind forces on each rotor almost directly into the tether. Another approach locates the multiple attach points along the central fuselage connecting the fixed wings, reducing the requirement for the fuselage to react to bending loads to the portion of the fuselage connected to the rotors. As shown in FIG. 17, the length of the two tether parts of the bridle connecting to the vehicle need to be change as change is made to the pitch angle.

Figure 1:
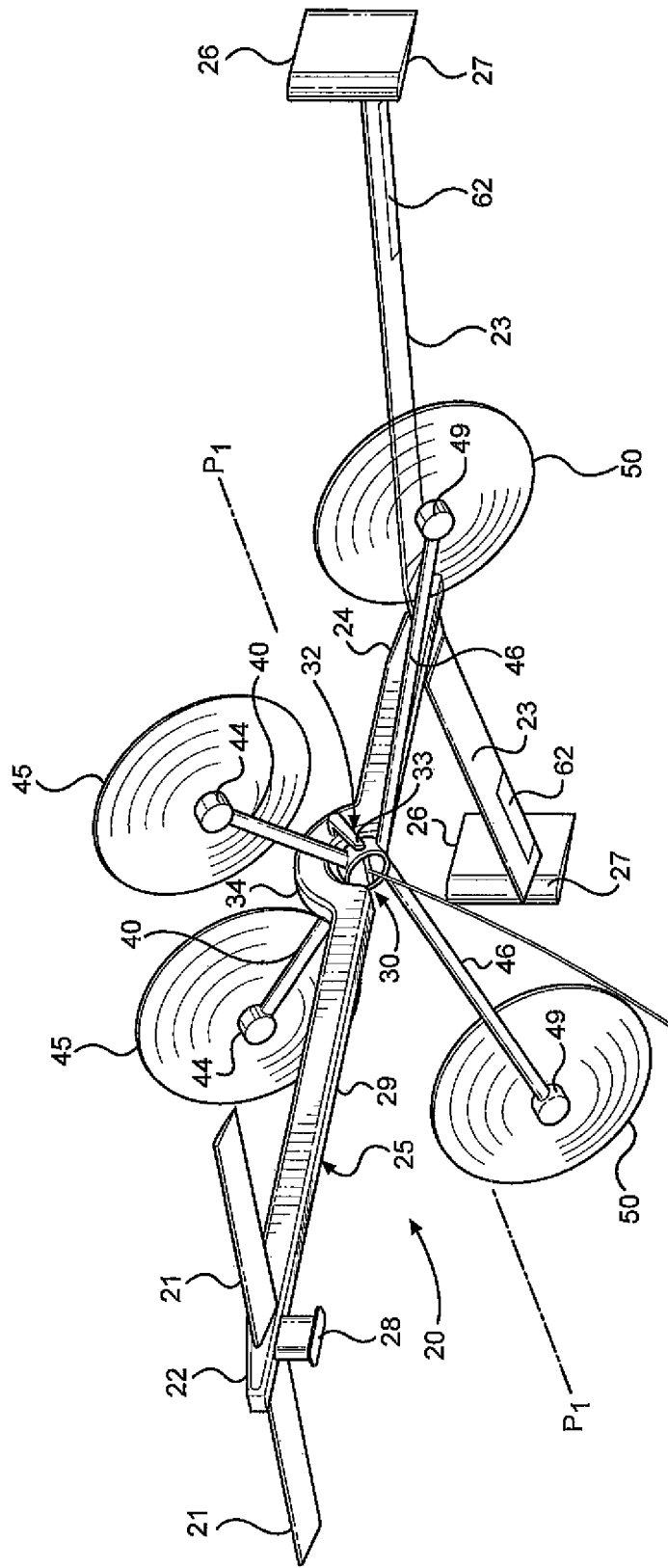
FIG. 1 is a bottom front perspective view of one embodiment of FEG of the present invention in a power generating configuration, viewed from below and upwind to the left.
Figure 2:
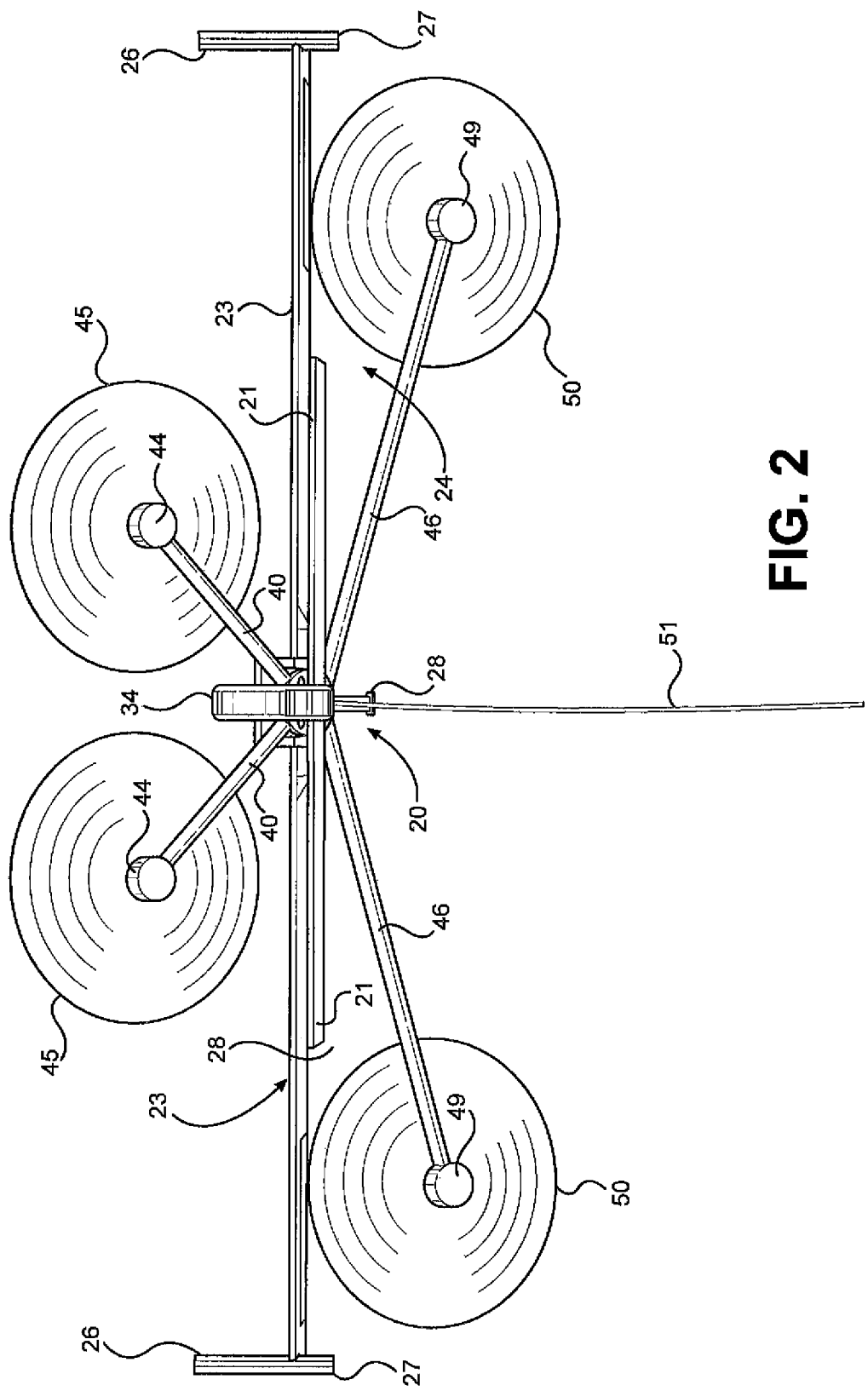
FIG. 2 is a front view of the FEG of FIG. 1 in a power generating configuration, viewed from straight downwind.
Figure 3:
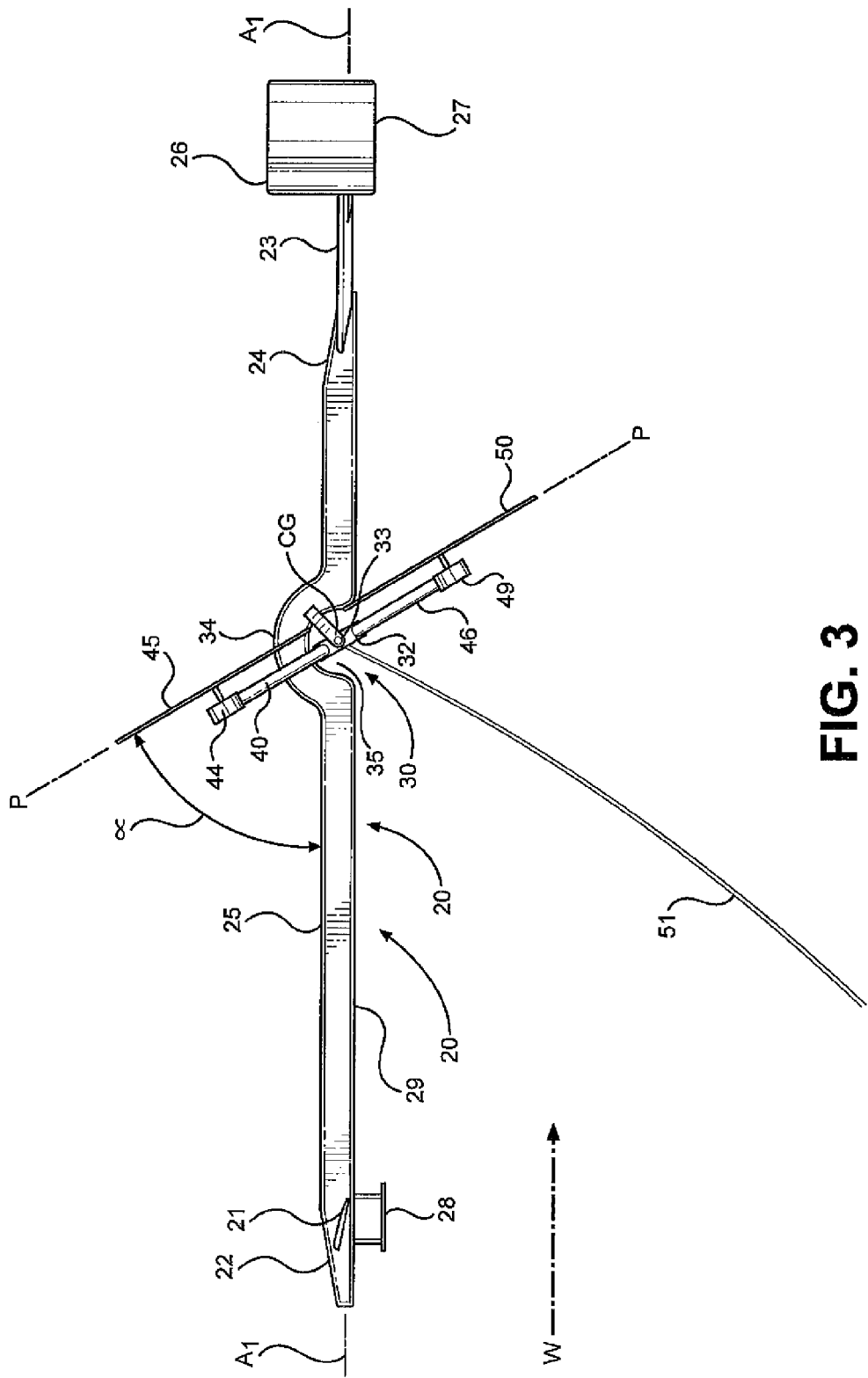
FIG. 3 is left side view of the FEG of FIG. 1 in a power generating configuration.
Figure 4:
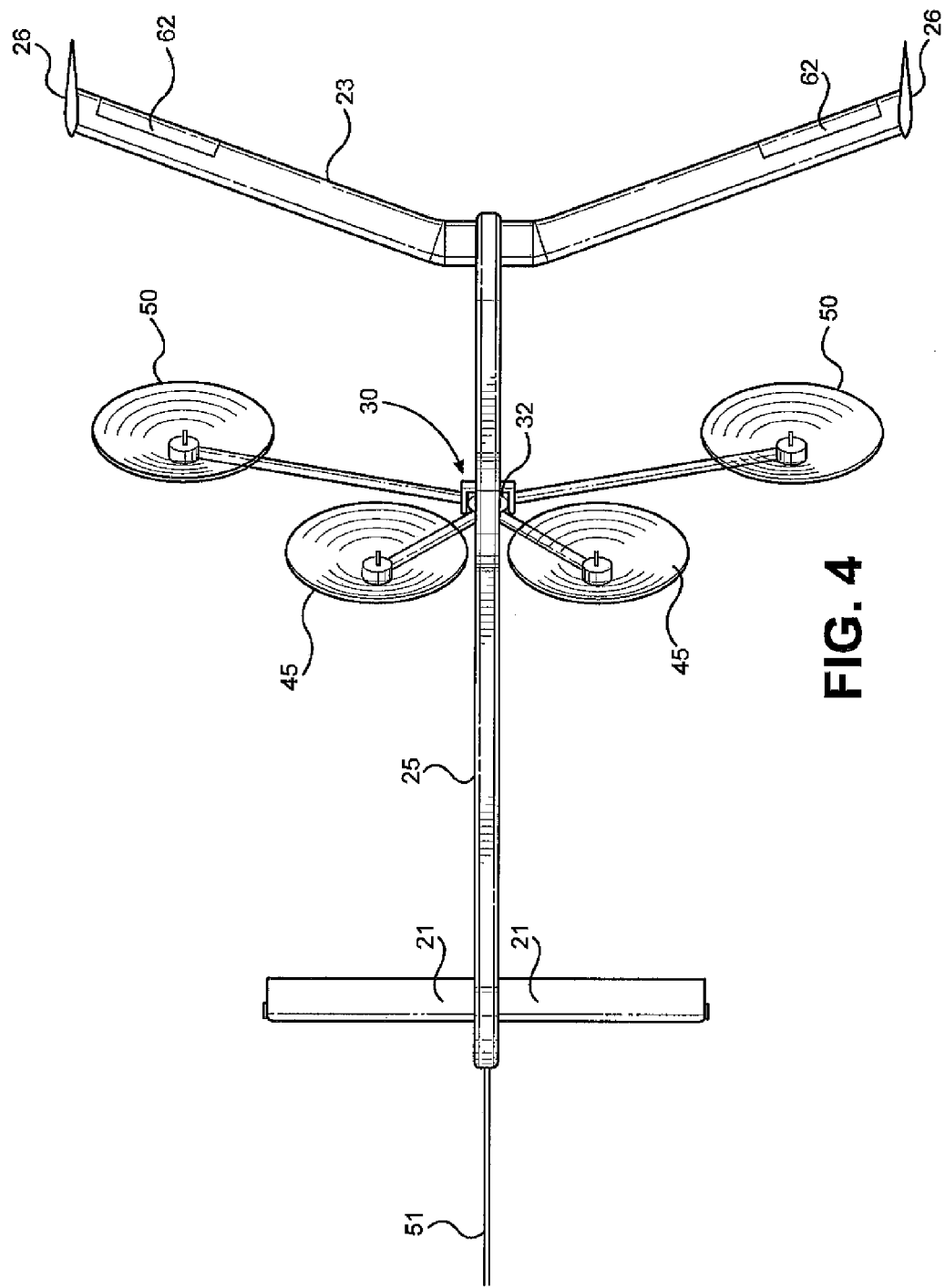
FIG. 4 is a top plan view of the FEG of FIG. 1 in a power generating configuration.
Figure 5:
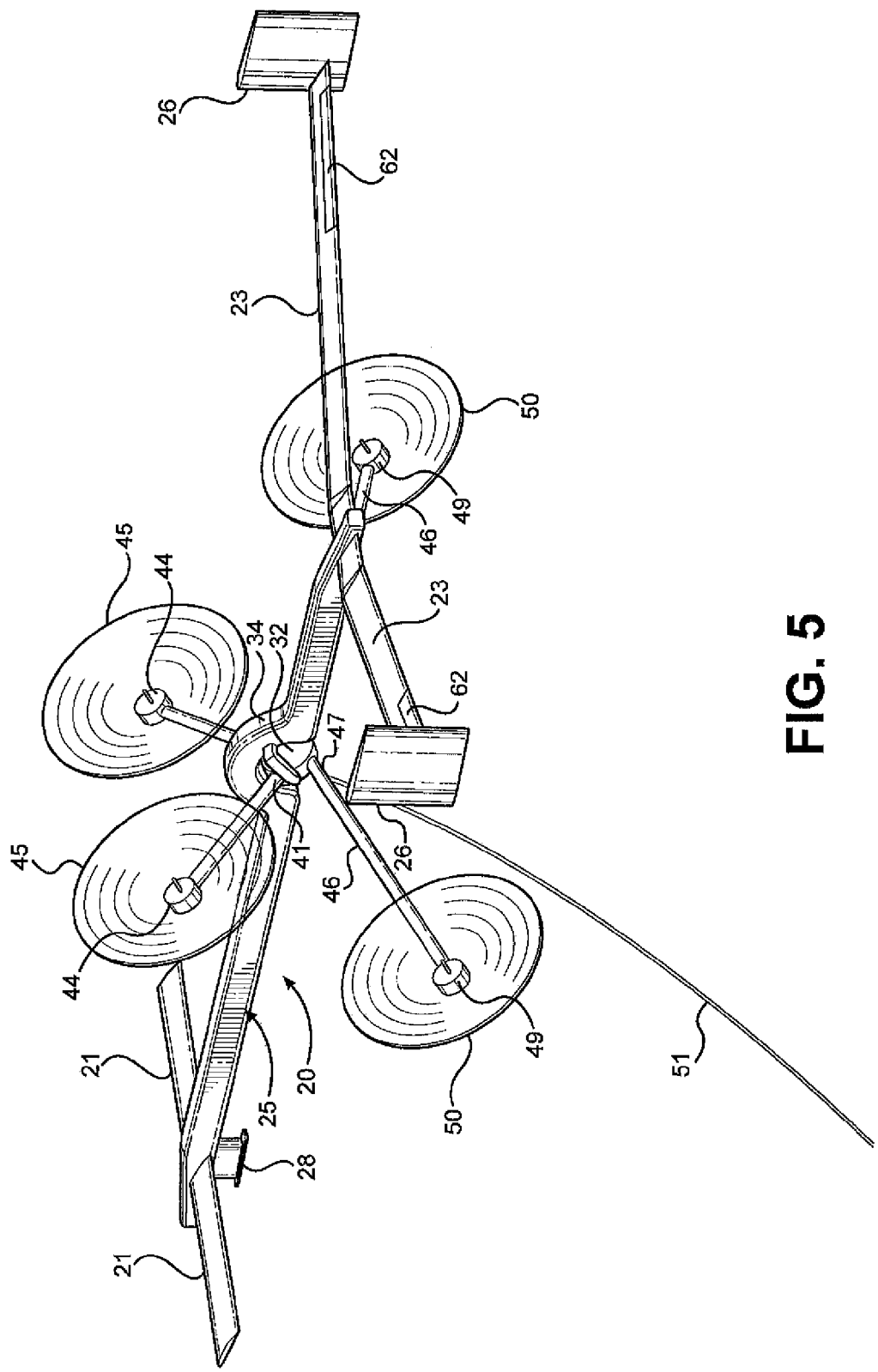
FIG. 5 is a top rear perspective view of the FEG of FIG. 1 in a power generating configuration.
Figure 6:
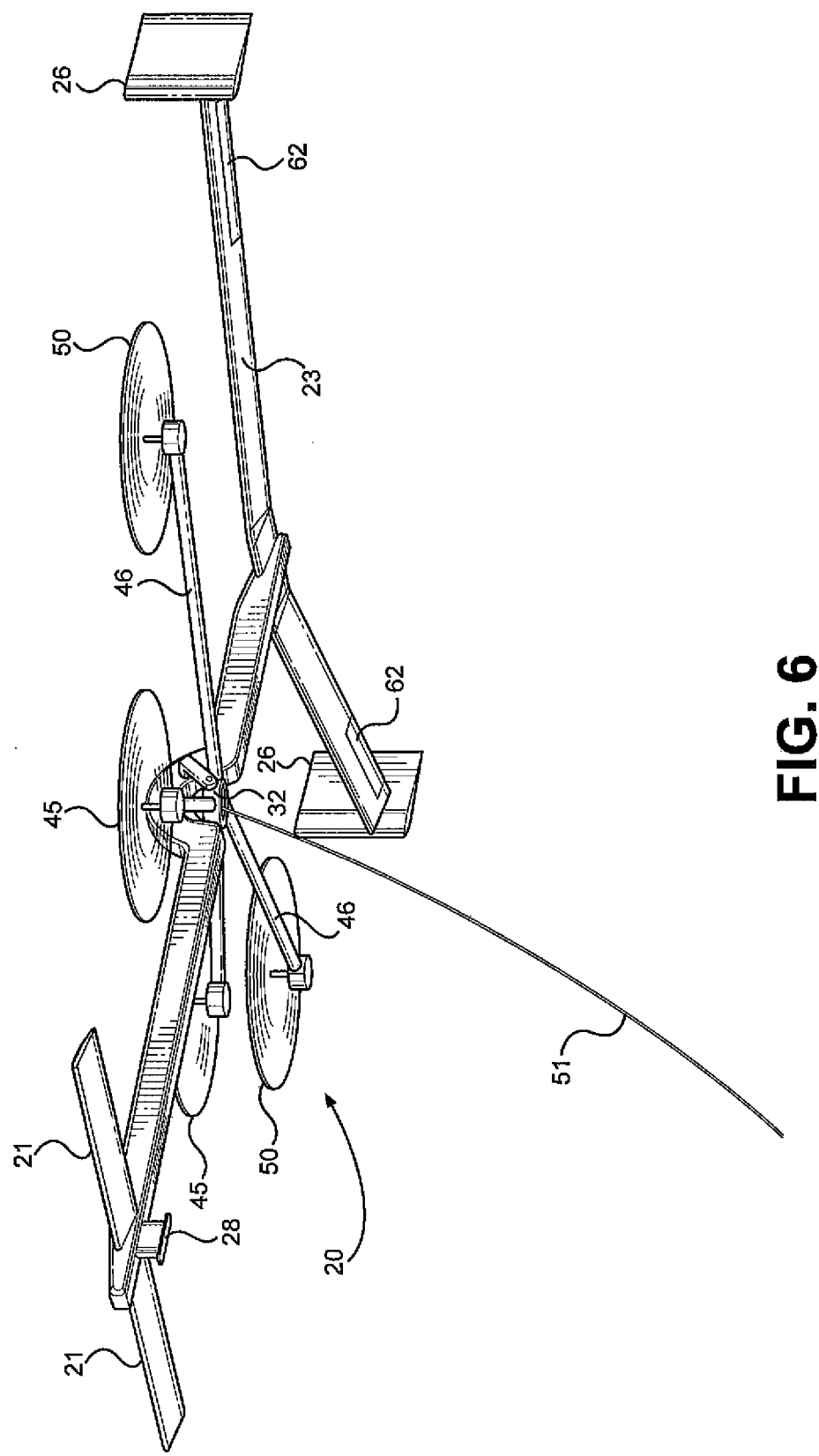
FIG. 6 is a bottom front perspective view of the FEG of FIG. 1 shown in a level landing configuration.
Figure 10:
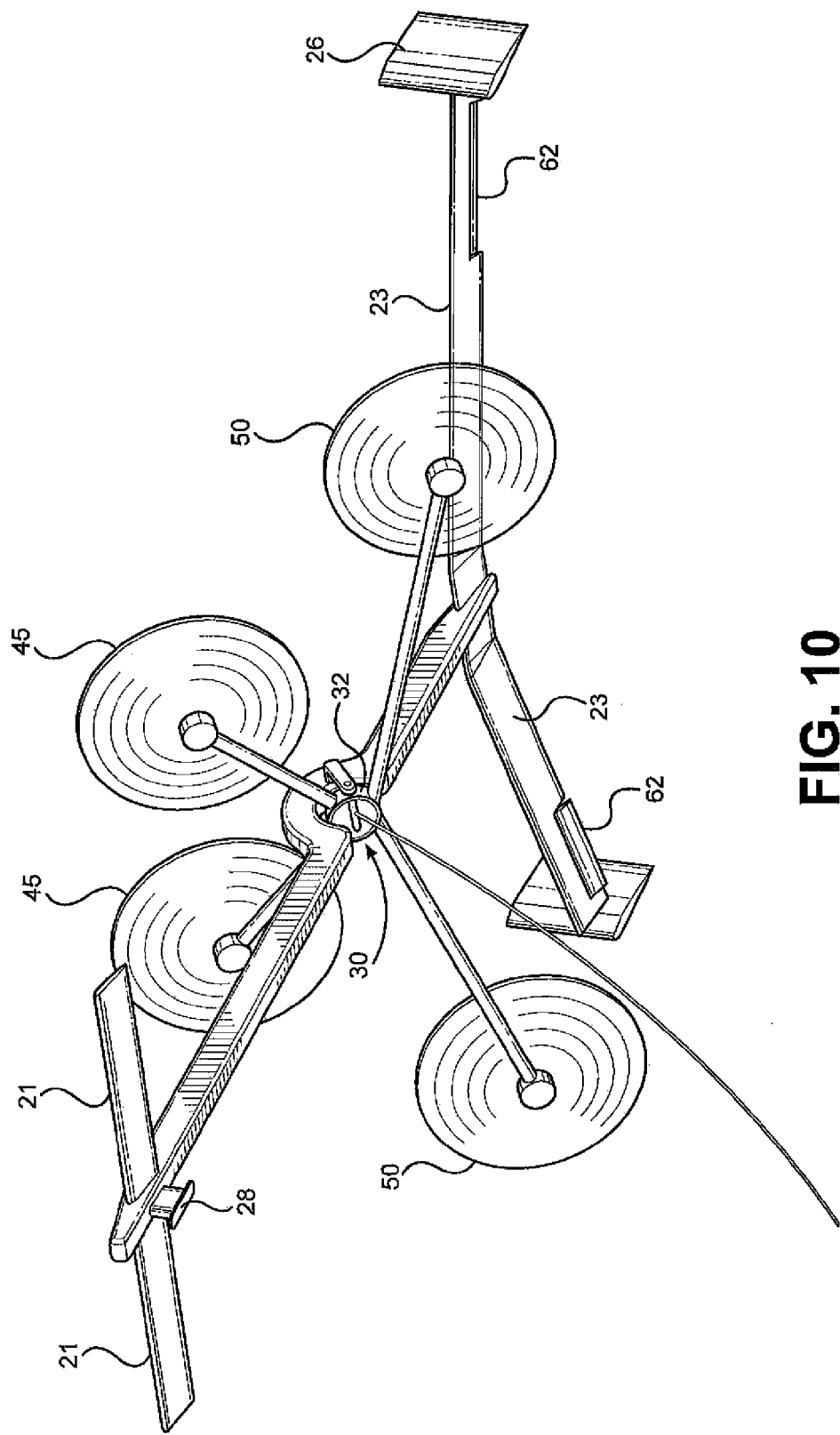
FIG. 10 is a bottom front perspective view of the FEG of FIG. 1 showing ailerons on both rear wings pitched upwardly and downwardly to roll the FEG in a power generating configuration.

Control of the vehicle flight attitude while generating can be accomplished by adjusting the auto-gyro rotor collective pitch alone, if a single point tether is used, or by a combination of adjusting the auto-gyro rotor collective pitch and adjusting fixed wing attitudes either by rotating the entire wing or by use of separate adjustable wing sections or ailerons 62 pivotally mounted to each of the main wings, as shown in FIGS. 10 and 11, or by rotating the entire wings or a separate adjustable aileron alone. Also, if a multiple part tether is used, adjustment of the length of the separate sections can be used to change vehicle orientation, either alone or in combination with rotating the entire wing or a separate adjustable aileron and adjusting the auto-gyro rotor collective pitch. Control of vehicle flight attitude during hovering flight as shown in FIGS. 6 and 7 is accomplished by adjusting rotor collective pitch alone. To roll the FEG 20, the ailerons 62 are pivoted with the aileron on one side of the fuselage lowered, see the right main wing in FIG. 11, and the aileron on the other side elevated, see the left side main wing in FIG. 11. This configuration will cause a roll to the left about the axis A-A of the fuselage. By reversing the positioning of the ailerons, a roll is established to the right about the axis A-A.

Figure 16:
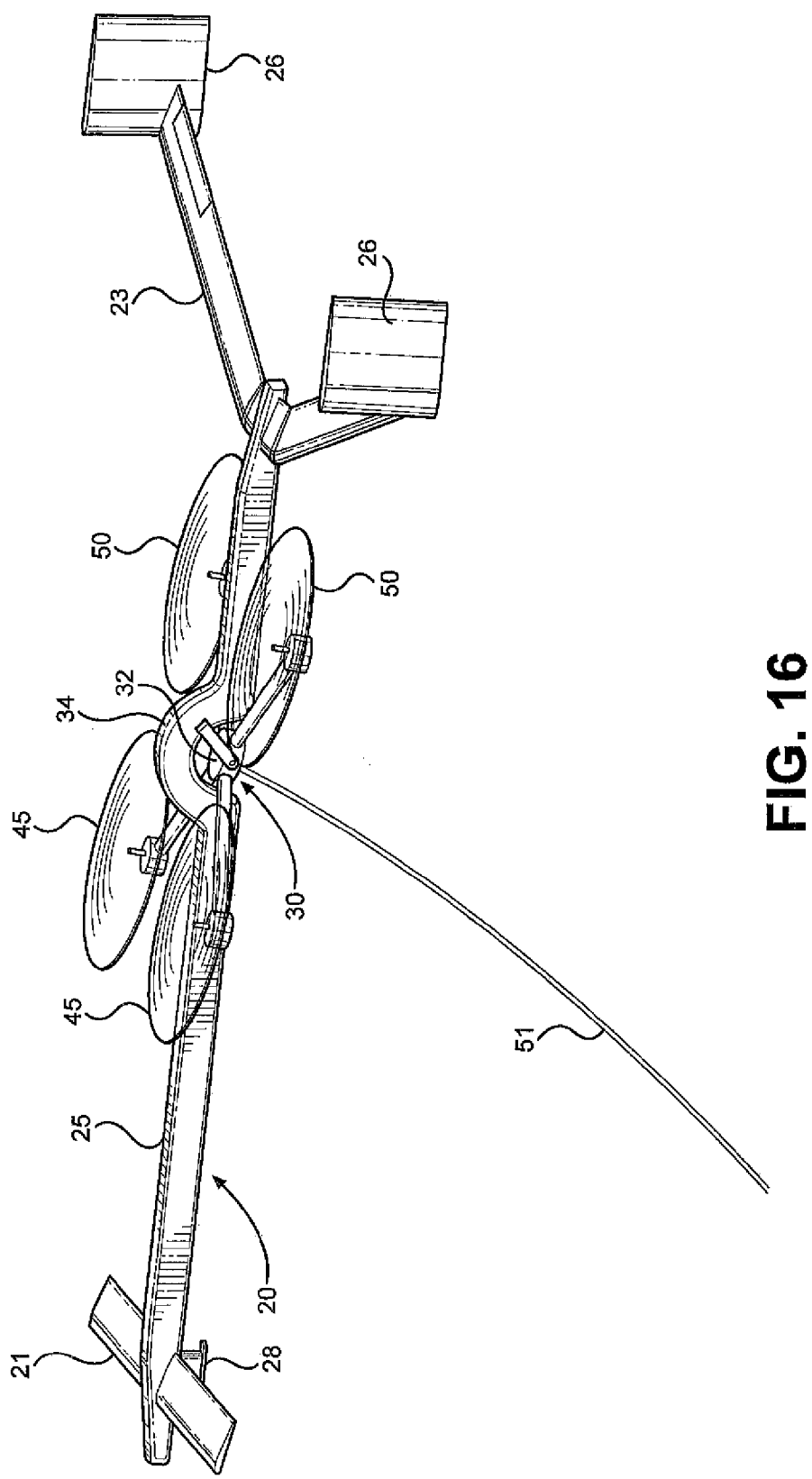
FIG. 16 is a top left side perspective view of the FEG of FIG. 1 shown changing from a landing configuration to a power generating configuration with rotors at a low angle of attack to the wind.

The transition from hovering flight to flying like a kite as necessary to generate power is done over a period of less than a minute. This is a simple increase in rotor plane pitch from near zero to a large positive angle. During this transition the air flow around the FEG is changing. The air flow through the rotors is straight downward in hovering flight. Downward air flow changes to a horizontal air flow through the inclined rotor plane from underneath and continuing downwind of the rotor with an added downward component of velocity in kite-like flight. When the angle of attack is small, as in FIG. 16, the downward component of the flow emerging downwind of each forward rotor 45 causes a reduction in thrust of an aft rotor 50 directly downwind. This is because the downward component of flow behind the forward rotor changes the apparent wind direction for the aft rotor. The apparent wind experienced by an aft rotor downwind of a forward rotor has a downward component, which is equivalent to a relative reduction in pitch angle for that aft rotor. Reduction of pitch angle reduces thrust. The result of the loss of thrust in an aft rotor is a rapid and uncontrolled increase in vehicle pitch. It is expected that the addition of the lift augmentation wings to the FEG of the present invention will mitigate the loss of control when transitioning from zero angle of attack, wherein the vehicle and rotor planes are horizontal, see FIG. 6, to high angle of attack, power generating configuration, see FIGS. 3 and 5. This is because much of the lift of the invention vehicle is provided by the fixed wings. This means that both a closely clustered rotor configuration, see FIG. 14, and the staggered rotor configuration previously described, are viable alternative configurations of this invention.

With reference to FIGS. 13 and 14, a FEG 120 having closely spaced rotors is shown as a second embodiment of the invention. FIG. 14 shows a rotor assembly 130 having a central mounting hub 132 that is to be either pivotally mounted to a fuselage 25, as described and shown with respect to the first embodiment of FIGS. 1-5, or fixedly mounted to the fuselage as shown with respect to the first embodiment as shown in FIGS. 8 and 9. The rotor assembly 130 is shown in a generating position in FIG. 13 wherein the plane of the forward rotors 145 and aft or rearward rotors 150 is at a high pitch angle. In this embodiment, the forward and rearward rotor support arms 140 and 146 are of equal length and the angle of the arms is such that the rotors 145 and 149 form an X-shaped or balanced square structure. The rotors are driven by motors 144 and 149, respectively.

With the present invention and as can be seen in FIG. 13, the problem of forward rotors 145 diminishing the lift of aft rotors 150 disappears when the angle of attack becomes large. At large positive angles of attack, the forward rotors 145 are so far above the aft and downwind rotors 150 that the downward directed air flow trailing the forward rotors does not reach the aft rotors, so the aft rotors operate in undisturbed air.

During use, the FEG 20 flies up from the ground and hovers as a multi-rotor helicopter. For takeoff and hovering, the FEG consumes electric power which is provided from a power grid or a generator at ground level, depending on the application. Electric power from the ground is transmitted through conductors in the tether and is used to create torque in the drive motors for each of the rotors. The drive motors and their controllers are designed to convert electric power coming up the tether from the ground into torque to turn the rotors, and also to convert excess torque available at the rotors into electrical energy to send down the same conductors in the tether for use on the ground. Rotors generate thrust by moving air downward, through the rotor blades. The amount of thrust is controlled either by rotational speed of the rotors, using a fixed pitch blade, or by varying the pitch of the blades while they are rotating at a constant rotational speed, or by a combination of the two techniques.

As the rotors create thrust, they require torque input to rotate. The amount of torque required times the rotational rate of the rotor is the power required to maintain that level of thrust. The torque input to keep the rotor turning and create thrust also results in a reaction torque from the air against the rotor. This torque is proportional to the thrust, and because there are pairs of rotors rotating in opposite directions, this torque is normally balanced if each rotor is producing the same thrust.

It is possible to control the FEG 20 rotation about a vertical axis, called yaw, by reducing the thrust of one pair of rotors rotating in one direction while increasing the thrust of another pair of rotors rotating in the opposite direction. If this is done to maintain the total thrust level constant, the FEG will only rotate in yaw, and maintain orientation about the pitch and roll axes, and its position. For the FEG to roll change orientation about the roll (longitudinal) axis or pitch (transverse) axis, the thrust is increased on the side of the FEG desired to rise, and decreased on the side desired to lower. Maneuvers can be combined as required, with roll, pitch and yaw rotations done simultaneously. The ailerons may also be used for roll as previously described.

For the FEG 20 to climb, overall thrust is increased and the FEG accelerates upward, descending is the opposite. For the FEG to move laterally, it is rolled or pitched so that a portion of the overall thrust vector is inclined in the direction desired, this component of thrust will accelerate the FEG in that direction. Once the FEG 20 has accelerated to the desired travel speed in a direction, it is leveled out to maintain that speed. The FEG 20 is stopped by rolling and or pitching in the opposite direction to the velocity until the FEG has decelerated to zero speed.

Once the FEG 20 climbs to a predetermined altitude for generation of power using high velocity winds, it flies downwind to a position where the tether angle with the ground is acceptable for the wind conditions and space available. The horizontal component of the tension in the tether now reacts with the force of the wind on the FEG 20. The preferred configuration of the FEG 20 has longer wings and wider rotor spacing at the aft than it does at the front, and will naturally rotate in yaw like a weather vane to face into the wind. This is caused by an unbalance in drag from the unequally spaced rotors on each side of the tether. As the vehicle yaws to face the wind, the drag on each side balances and the vehicle will maintain a heading. Next, the FEG 20 is commanded to gradually pitch up to a large angle of attack α, see FIG. 3. The positive pitch angle of attack exposes the underside of the rotors to the wind. The thrust of the rotors now has a downwind component, plus a vertical component. The vertical component of thrust must remain equal to the FEG 20 weight plus the vertical component of tether tension where it attaches to the FEG 20 or the FEG 20 will climb or descend. Because the rotor area now exposed to the wind has increased, the thrust also increases. The larger the pitch angle, the larger the exposed area and the larger the thrust. As the FEG 20 angle of attack is increasing, the blade pitch of the rotors must be decreased to limit thrust increase, so that the vertical component of thrust does not increase. The inflow of the wind under the rotors applies a torque to the rotors, which drives them to a faster rotational rate, and this accelerating torque increases with reduced rotor blade pitch.

To prevent the rotors from accelerating to a faster rotational rate, the electric motors apply torque in the direction against this acceleration, which creates electric power that is sent down the conductors in the tether for use on the ground. This reverse torque due to the force of wind on the rotor blades is referred to as a regenerative braking process for the motors wherein the voltage being created by the braking process overcomes the voltage of the current being supplied from the ground through the tether. When this occurs, current flow is from the FEG 20, 120 to the ground. The flow of current for each motor is controlled through the motor controllers which act like switches and which continuously monitor operative conditions within each permanent magnet DC motor of the FEG. When the pitch maneuver is complete, the FEG is flying like a kite, with a large pitch angle of attack, and the tether tension balancing the force of the wind on the FEG.

In each embodiment of the invention, the fuselages 25 are preferably fabricated from a combination of machined aluminum plates and formed sheets, but also could be fabricated from a multi-part or monolithic composite material. The fuselage is used to contain avionics and computer systems necessary for FEG control, electronics necessary to communicate with the ground, motor control electronics, and power conversion electronics. These controls will preferably be contained in sealed enclosures to prevent moisture and particulate contamination from damaging the function of the electronics.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. A flying electric generator for obtaining power from wind currents comprising a fuselage having fore and aft portions and an intermediate portion, a rotor assembly including at least two forward rotors each driven by a separate electric motor and each being mounted to separate outer end portions of a pair of forward extending support arms and wherein inner ends of the forward support arms are mounted to a central hub mounted at the intermediate portion of the fuselage, the rotor assembly also including at least two rear rotors each driven by a separate electric motor and each being mounted to an end of a pair of rearward extending support arms and wherein inner ends of the rearward support arms are mounted to the central hub, at least one first forward wing mounted to the forward portion of the fuselage and extending outwardly on opposite sides of the fuselage and at least one second rear wing mounted to the rear portion of the fuselage and extending outwardly on opposite side of the fuselage and wherein the central hub is mounted to an intermediate portion of the fuselage between the first and second wings, and utilizing said electric generator to generate electrical power from the wind.

2. The flying electric generator of claim 1 wherein the central hub is mounted at a center of gravity of the fuselage and rotor assembly.

3. The flying electric generator of claim 2 wherein the central hub is pivotally mounted about a pivot axis to the intermediate portion of the fuselage so that a pitch angle of the rotors to a central elongated axis of the front and rear portions of the fuselage may be selectively changed, and the pivot axis being aligned with a plane of the elongated axis and oriented perpendicular to the elongated axis in a horizontal plane.

4. The flying electric generator of claim 2 wherein the intermediate portion of the fuselage is spaced above the longitudinal axis of the front and rear portions of the fuselage.

5. The flying electric generator of claim 1 wherein the at least one first wing is formed of two first canard wings mounted to the front portion of the fuselage and the at least one second wing is formed as two second wings mounted to the rear portion of the fuselage and wherein the second wings are longer and larger than the first wings.

6. The flying electric generator of claim 5 including ailerons mounted to each of the second wings.

7. The flying electric generator of claim 5 including a vertical stabilizer mounted to each of the second wings.

8. The flying electric generator of claim 7 wherein a lower portion of each vertical stabilizer extends below the second wings and a bottom of the fuselage so as to function as landing gear.

9. The flying electric generator of claim 8 including a vertical strut extending downward from the bottom of the front portion of the fuselage so as to function as landing gear.

10. The flying electric generator of claim 5 wherein each of the first and second wings is pivotally mounted to the fuselage.

11. The flying electric generator of claim 5 wherein the second wings are angled outwardly and aft direction relative to the fuselage.

12. The flying electric generator of claim 1 including ailerons mounted to the at least one second wing.

13. The flying electric generator of claim 1 including a pair of vertical stabilizers mounted to the at least one second wing.

14. The flying electric generator of claim 13 wherein a lower portion of each vertical stabilizer extends below the at least one second wing and a bottom of the fuselage so as to function as landing gear.

15. The flying electric generator of claim 14 including a vertical strut extending below the bottom of the front portion of the fuselage so as to function as landing gear.

16. The flying electric generator of claim 1 wherein the central hub is fixedly mounted to the intermediate portion of the hub.

17. The flying electric generator of claim 1 wherein the at least two forward rotors are more closely spaced to the fuselage than the at least two rear rotors such that the at least two rear rotors receive clean air during flight.

18. The flying electric generator of claim 1 wherein the at least two forward rotors and the at least two rear rotors are uniformly spaced relative to the fuselage and one another.

19. A flying electric generator for obtaining power from wind currents comprising a fuselage having fore and aft portions and an intermediate portion, a rotor assembly including at least two forward rotors each driven by a separate electric motor and each being mounted to separate outer end portions of a pair of forward extending support arms and wherein inner ends of the forward support arms are mounted to a central hub mounted at the intermediate portion of the fuselage, the rotor assembly also including at least two rear rotors each driven by a separate electric motor and each being mounted to an end of a pair of rearward extending support arms and wherein inner ends of the rearward support arms are mounted to the central hub, first forward wings mounted to the forward portion of the fuselage and extending outwardly on opposite sides of the fuselage and second rear wings mounted to the rear portion of the fuselage, the second wings being larger than the first wings and extending outwardly on opposite side of the fuselage, and the central hub being pivotally mounted relative to the intermediate portion of the fuselage so that a pitch angle of the forward and rear rotors to a central elongated axis of the front and rear portions of the fuselage may be selectively changed.

20. The flying electric generator of claim 19 including a vertical stabilizer mounted to each of the two second wings, a lower portion of each vertical stabilizer extends below the at least one second wing and a bottom of the fuselage so as to function as landing gear, and a vertical strut extending downward below the bottom of the front portion of the fuselage so as to function as landing gear.

21. The flying generator of claim 19 including a aileron pivotally mounted to each second wing.

22. The flying generator of claim 19 wherein the first wings are canard style wings.

* * * * *